United States Patent [19]

Endo et al.

[11] Patent Number: 4,842,540
[45] Date of Patent: Jun. 27, 1989

[54] CONNECTOR HOUSING AND METHOD FOR PRODUCING SAME

[75] Inventors: Takayoshi Endo; Satoshi Yamada, both of Shizuoka, Japan

[73] Assignee: Yazaki Corporation, Tokyo, Japan

[21] Appl. No.: 160,040

[22] Filed: Feb. 24, 1988

[30] Foreign Application Priority Data

Mar. 10, 1987 [JP] Japan .................................. 62-53065

[51] Int. Cl.$^4$ ........................................ H01R 13/432
[52] U.S. Cl. ...................................... 439/271; 439/736
[58] Field of Search ............................... 439/271, 736

[56] References Cited

U.S. PATENT DOCUMENTS 3,184,701 5/1965 Ellis ...................................... 439/736

FOREIGN PATENT DOCUMENTS 1020395 12/1957 Fed. Rep. of Germany ...... 439/736

Primary Examiner—Joseph H. McGlynn
Attorney, Agent, or Firm—Sughrue, Mion, Zinn, Macpeak & Seas

[57] ABSTRACT

A connector housing assembly having a ring-like packing formed integrally with a resin housing member to provide an improved sealing function at a reduced manufacturing cost. The housing is formed by resin molding using male and female molds. In one embodiment of the invention, the first male mold is removed and replaced with another male mole shaped so as to form a hollow portion corresponding to the desired shape of the packing. Rubber material is poured into the hollow portion through lead-in paths in at least one of the female mold or the second male mold. In another embodiment, the two molds used to form the housing are both removed, and the first male mold is replaced with a second male mold defining the hollow portion used to form the packing.

3 Claims, 5 Drawing Sheets

CONNECTOR HOUSING AND METHOD FOR PRODUCING SAME

BACKGROUND OF THE INVENTION

The present invention relates to a connector housing for connecting a male and a female connector with each other with a waterproof seal therebetween.

Conventionally, as shown in FIG. 1A, a housing (not-shown) of a male connector is inserted into a housing 21 of a female connector through a housing fitting opening 21a with an airtight seal being formed by the coupling between an end portion of the housing of the male connector and ring-like packing 22 provided at one end of the housing 21 of the female connector. A protrusion 22a is formed on the ring-like packing 22 provided at the end portion of the housing 21. The protrusion 22a is fitted into a locking hole 21b formed in the housing 21 so as to attach the ring-like packing 22 to the housing 21.

FIG. 1B shows an alternative manner of attaching the ring-like packing to the housing. That is, a ring-like packing 23 is disposed at an inside end portion of a housing 21, and a packing holder 24 is inserted into the housing through a fitting opening 21a of the housing so that a locking protrusion 24a of the packing holder 24 is engaged with a locking hole 21c of the housing 21.

As described above, in attaching the ring-like packing to the housing in a predetermined position, it is necessary to prepare the ring-like packing and the housing separately from each other and form them in such a manner that the protrusion of the ring-like packing, which is made of a rubber material, cannot be dislodged from the locking hole of the housing. Further, in the case where a packing holder is used, various factors increase the cost of the drive, such as production of a metal mold for the packing holder and the amount of work for attaching the packing holder to the housing.

There are further disadvantages in that the protrusion of the ring-like packing is apt to be dislodged from the locking hole of the housing because the protrusion is elastic, resulting in an imperfect fitting state and making it impossible for the ring-like packing to maintain a waterproof and airtight sealing condition.

SUMMARY OF THE INVENTION

The present invention is intended to provide a housing provided with a ring-like packing in which the disadvantages in the prior art in attaching the ring-like packing within the housing are eliminated and which can surely maintain a waterproof and airtight sealing condition with a simple arrangement, to provide a housing having a ring-like packing integrally attached to the housing, and to provide a manufacturing method for the same.

In order to achieve the above-mentioned objects, according to the present invention, a connector housing is provided characterized in that a rubber material which functions as a ring-like packing is poured into the housing through a metal mold so as to form the ring-like packing integrally with a side wall of the housing at a fitting portion thereof. The method of producing such a connector housing is characterized by the steps of: pouring synthetic resin between a male and a female metal mold to thereby form a housing; arranging another male metal mold having a hollow portion corresponding to a ring-like packing in place of the first-mentioned male metal mold; and pouring a rubber material through rubber material lead-in paths provided in each of or either one of the female metal mold and the other male metal mold to thereby form the ring-like packing integrally with the housing.

Since the ring-like packing is formed integrally with the housing in the arrangement according to the present invention, the protrusion of the ring-like packing is prevented from being dislodged from the locking hole of the housing, and it is possible to surely attain a waterproof and an airtight seal upon connecting the connector housings.

Further, compared with the conventional case where a packing holder is used to fix the ring-like packing to the housing, it is possible to attach the ring-like packing to the housing through a simple attaching process with a small number of steps and inexpensively because the ring-like packing is attached to the housing while the housing itself is being produced.

DESCRIPTION OF THE PREFERRED EMBODIMENTS

Figure 1A:
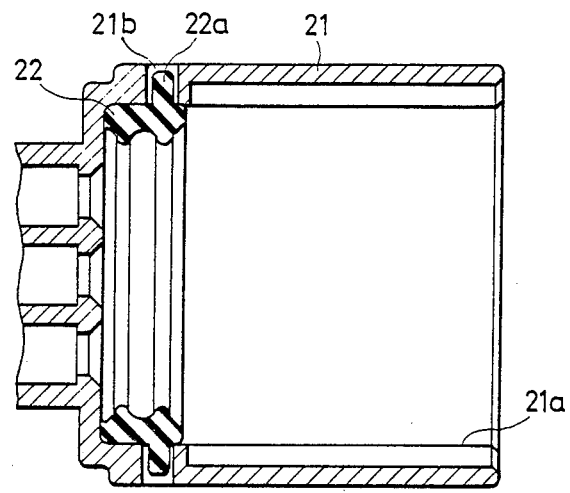
FIG. 1A and 1B are sectional views of conventional housings provided with ring-like packings.
Figure 1B:
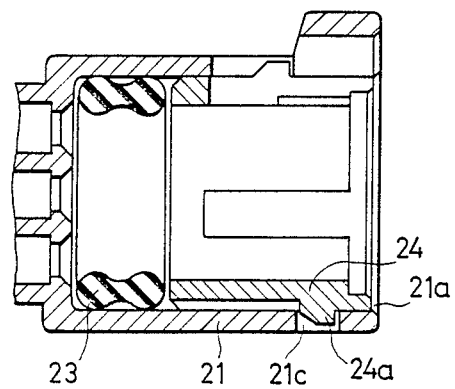
Figure 2:
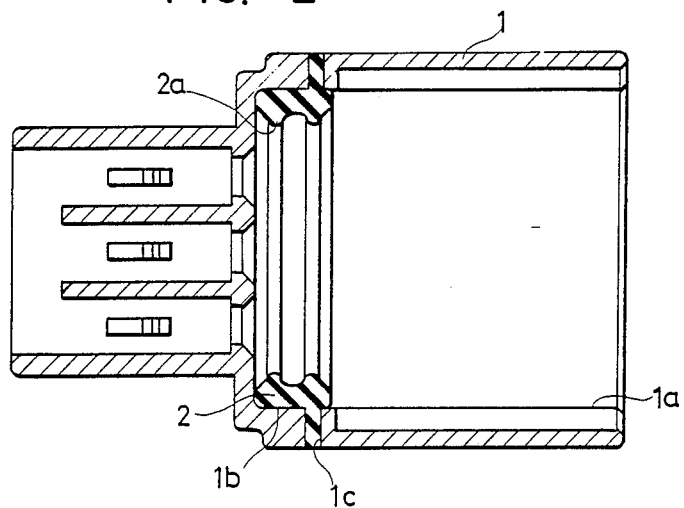
FIG. 2 is a sectional view showing a housing with a ring-like packing fixed thereto constructed according to the present invention.

Referring to the drawings, preferred embodiments of the present invention will now be described:

FIG. 2 shows a housing constructed according to the present invention. In the drawing, a housing 1 of a female conductor is arranged to fit with a housing of a male connector (not-shown) in a well-known manner while ensuring a waterproof and airtight sealing condition through a ring-like packing at a fitting position between the respective housings of the female and male connectors.

Inside the housing 1 of the male connector, a ring-like packing 2 is provided integrally with the inner wall of the housing 1 at a position opposite a fitting opening 1a of the housing, that is, at a portion 1b at which a fitting opening of a housing of a male connector is disposed when the housing of the male connector is fitted into the housing 1 of the female connector. The ring-like packing 2 is integrally formed on the inner wall of the portion 1b of the housing 1 by pouring an adhesive rubber material between the housing 2, after the latter is molded, and a female metal mold having the shape of the ring-like packing (as will be described in more detail below) through a plurality of pouring openings 1c formed in the housing 1.

The ring-like packing 2 formed on the housing 1 according to the present invention is made of a rubber material containing an adhesive material so that the ring-like packing will well adhere to the housing 1. Further, as to the rubber material, a rubber kneaded material may be used in the case where the rubber material is poured through the injection openings 1c of the housing 1 by extrusion molding, while liquid silicon rubber may be used in the case where the rubber material is poured by injection molding.

The ring-like packing 2 is fixed to the inner wall surface of the housing 1 and the injection openings 1c in an integrated state. Accordingly, when the respective connector housings are connected together, a contact portion 2a of the ring-like packing 2 will tightly contact with a fittings opening end of the other housing to thereby provide a sufficient waterproof and airtight sealing condition.

Figure 3:
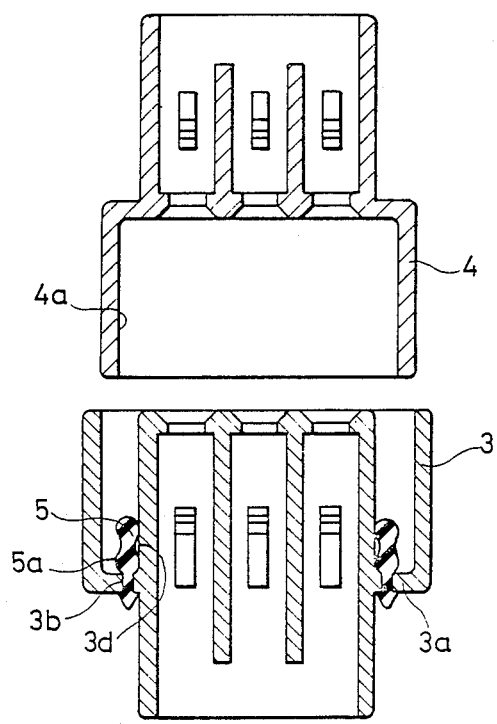
FIG. 3 is a sectional view of another embodiment of a housing with a ring-like packing fixed thereto provided according to the present invention.

FIG. 3 shows another embodiment in which a ring-like packing is provided on a housing of a male connector. In a connector type in which a housing 3 of a male connector and a housing 4 of a female connector are fitted with each other, pouring openings 3b are formed in a rear wall portion 3a of the housing 3 of the male connector in the fitting direction, and a ring-like packing 5 is formed which is integrally connected to an inner wall portion of the pouring openings 3b and an outer wall portion 3d of an inner cylindrical portion.

In such an arrangement, an inner wall surface 4a of an insertion end of the female connector housing 4 is connected to an engaging surface 5a of the ring-like packing 5 of the male connector housing 3 with an airtight and waterproof seal being provided between the housings of the connector.

Although not illustrated, a waterproof plug is fitted in the housing at a terminal insertion side thereof.

According to the present invention, the attaching position and attaching direction of the ring-like packing with respect to the housing are not limited to the foregoing embodiments but may be suitably varied in accordance with the desired shapes and fitting states of the male and female connectors. The pouring openings of the housing in the foregoing embodiments are not always necessary because it is possible to form a ring-like packing if a rubber lead-in path is provided in the female metal mold, as described below.

Next, description will be made as to a method for forming a ring-like packing integrally with a housing according to the present invention.

In a first embodiment of the method according to the present invention, a female metal mold used to produce the housing is reused to form a ring-like packing on a housing, and in a second embodiment a ring-like packing is formed after a housing is taken out of a female metal mold used to produce the housing.

Figure 4:
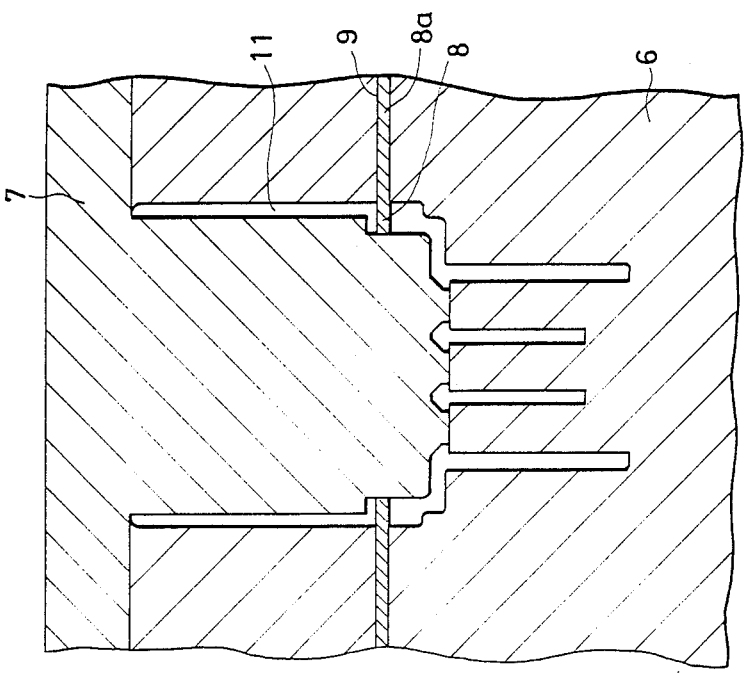
FIG. 4 is a schematic sectional view showing a first step of a method according to the present for producing a invention.

In the first embodiment of the method according to the present invention, as shown in FIG. 4, a male metal mold 7 is disposed in a female metal mold 6 with a space 11 therebetween corresponding to the desired shape of the connector housing 1, and a resin material for forming the housing is poured into the space 11 through a part (not shown) of the female metal mold 6. In order to form a ring-like packing, cores 8 are disposed in the space 11 between the female metal mold 6 and the male metal mold 7, at positions where rubber pouring openings of the housing are to be formed, through respective rubber lead-in paths 9 formed in the female metal mold 6. When a resin material for forming the housing is poured, the rubber material lead-in paths 9 are blocked by respective cores 8a, and the end portions of the respective cores 8a are positioned in the space 11 as the cores 8.

Figure 5:
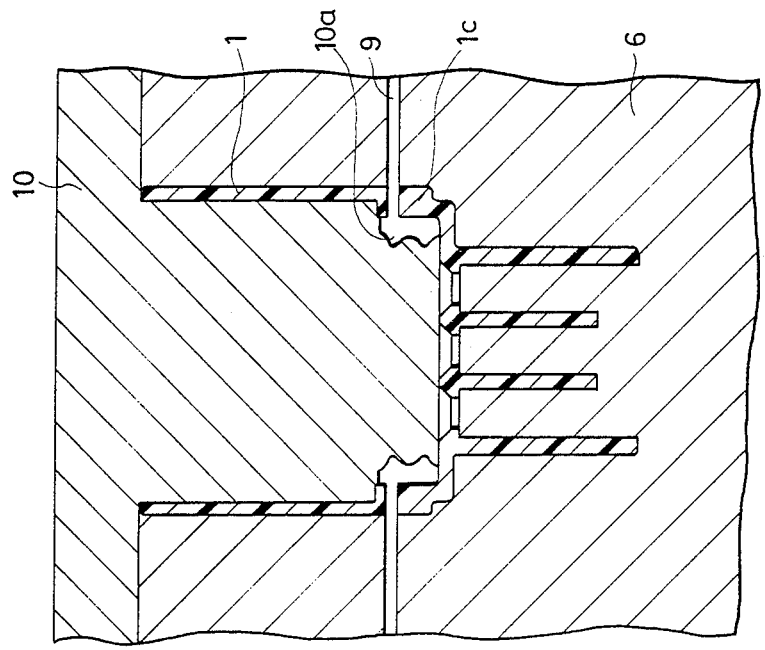
FIG. 5 is a schematic sectional view showing a second step of the method according to the present invention.

After the housing 1 having the pouring openings 1c has been formed with the resin material poured in the space 11, as shown in FIG. 5, another male metal mold 10 having a hollow portion 10a for forming the ring-like packing is inserted into the housing 1 in place of the male metal mold 7, and the cores 8 and 8a, which were disposed in the rubber lead-in paths 9 and the pouring opening positions, respectively, are removed from the female housing 6.

In that state, a rubber material is poured through the rubber material lead-in paths 9 of the female metal mold 6 so that the rubber material is filled in the hollow portion 10a through the pouring openings 1c of the housing 1, and the adhesive rubber material tightly adheres to and is integrated with the inner wall surface of the pouring openings of the housing 1 and the pouring openings 1c thereof, thereby forming the ring-like packing 2.

Figure 6:
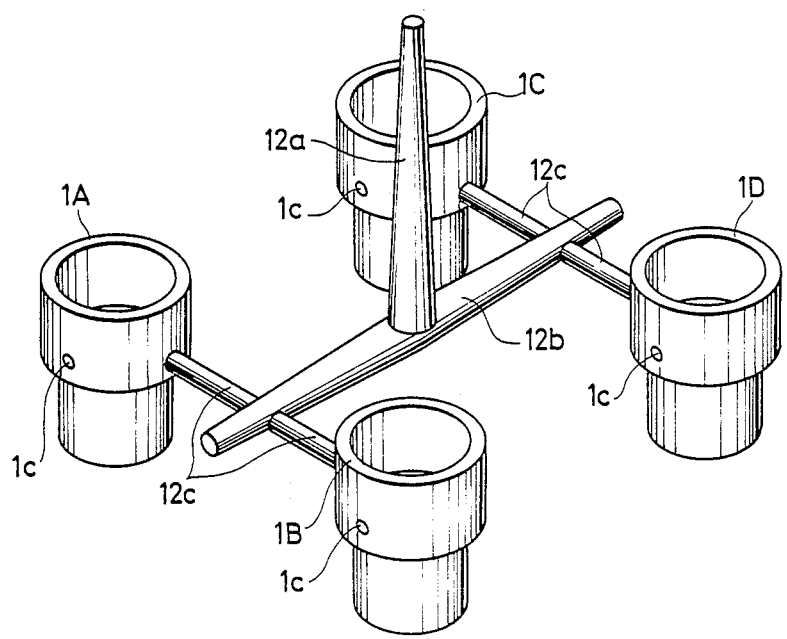
FIG. 6 is a perspective view showing a state where housings are removed from a metal mold in another method according to the present invention.

The second embodiment of the method according to the present invention differs from the first embodiment in that, in the second embodiment, the housing is removed from the female metal mold 6 when the ring-like packing is to be attached to the housing produced between the female metal mold 6 and the male metal mold 7, while in the first embodiment, the process of attaching the ring-like packing to the housing is carried out in the female metal mold 6. FIG. 6 shows the state in which the completed housing is removed from the female metal mold 6. In this embodiment, four housings 1A, 1B, 1C and 1D are simultaneously produced through four branch pouring paths branching from one resin pouring opening, and the housings 1A, 1B, 1C and 1D are connected to each other through connecting paths 12a, 12b and 12c.

Figure 7:
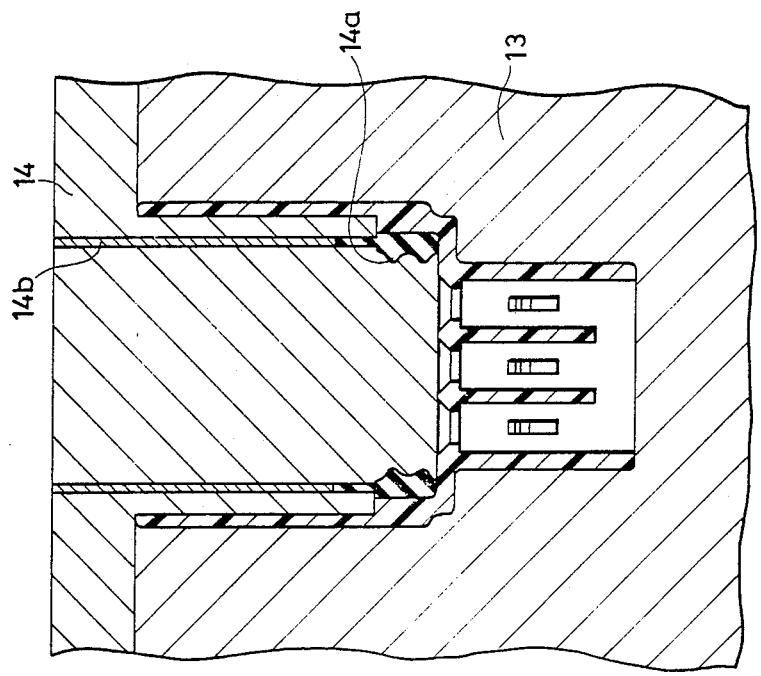
FIG. 7 is a schematic sectional view showing a state where a ring-like packing is formed on the housing of FIG. 6.

As shown in FIG. 7, a female metal mold 13 and a male metal mold 14a re disposed in the outside and inside of each of the housing 1 so that rubber lead-in paths 13a of the female metal mold 13 are aligned with respective pouring openings 1c formed in the housing 1, and a hollow portion 14a of the male metal mold 14 corresponding to the shape of the ring-like packing is aligned with the pouring openings 1c of the housing 1. A rubber material is then poured through rubber lead-in paths 13a of the female metal mold 13 to thereby form the ring-like packing 2 integrally with the inner wall portion of the housing 1.

Figure 8:
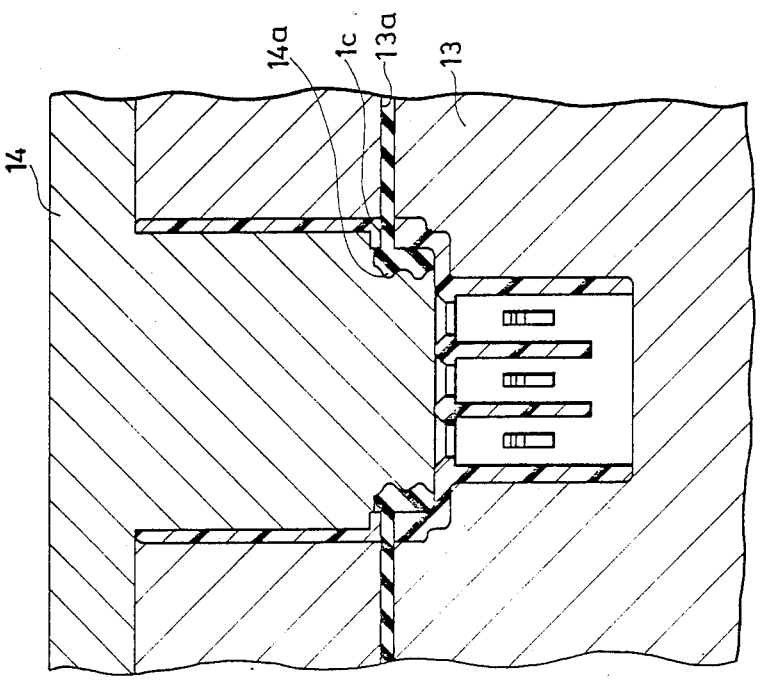
FIG. 8 is a schematic sectional view showing still another embodiment of the method according to the present invention, in which rubber lead-in paths are formed in a male metal mold.

A description has been given above as to the case where the rubber materal lead-in paths are formed in the female metal mold and the rubber maerial is poured into the hollow portion formed in the male metal mold corresponding to the ring-like packing. However, in accordance with another embodiment of the present invention, the housing can be produced in a manner as shown in FIG. 8 in which, instead of providing the rubber lead-in paths in the female metal mold, rubber lead-in paths 14b communicating with a hollow portion 14a corresponding to the shape of a ring-like packing are formed in the male metal mold 14 and a rubber material is poured in the hollow portion 14a through the rubber lead-in paths 14b to thereby form a ring-like packing adhesively integrally with the inner wall portion of a housing 1 after the housing has been formed. In this case, no pouring openings are formed in the housing. Further, alternatively, a rubber material may be poured into a hollow portion formed in a male metal mold corresponding to the shape of a ring-like packing through rubber material lead-in paths formed in both the male and female metal molds.

According to the present invention, in the case where the rubber material lead-in paths are provided in the male metal mold and the rubber material poured therethrough, locking holes for preventing the packing from being dislodged corresponding to the pouring openings may be provided in the side wall portion of the housing where a ring-like packing is to be provided, or alternatively, the housing may be arranged without the provision of any such locking holes.

In the foregoing arrangement according to the present invention, since the ring-like packing is integrally molded on the housing, it is possible to eliminate the disadvantages of the prior art, in which separate metal molds for producing the housing and the ring-like packing are required, it is necessary to fixedly attach the ring-like packing to the housing produced separately from the ring-like packing, and the fixture and attachment of the ring-like packing to the housing are not stable, leading to problems in the waterproof and airtight sealing function. Moreover, with the invention the ring-like packing can be fixed to the housing at a low cost, the waterproof and airtight sealing effect is improved with a simple arrangement, and the ring-like packing is positively prevented from being dislodged, thereby preventing imperfect fitting of the connector housings.

We claim:

1. A connector housing assembly comprising: a substantially elongated annular cylindrical housing formed integrally of a resin material; and a rubber ring-like packing formed by pouring an adhesive rubber material into said housing through a metal mold such that said rubber ring-like packing adheres to an inner side wall of said housing at a fitting portion thereof so as to form a unitary connector housing assembly, whereby when said connector housing assembly is coupled to a second connector housing, said rubber ring-like packing sealingly engages said second connector housing.

2. A method for producing a connector housing assembly comprising the steps of: pouring synthetic resin between a male and a female metal mold to thereby form a housing; arranging another male metal mold having a hollow portion corresponding to a ring-like packing in place of said first-mentioned male metal mold; and pouring a rubber material through rubber material lead-in paths provided in at least one of said female metal mold and said other male metal mold to thereby form said ring-like packing integrally with said housing.

3. A method for producing a connector housing assembly comprising the steps of: pouring synthetic resin between a male and a female metal mold to thereby form a housing; removing said housing; disposing said housing between another female metal mold and another male metal mold having a hollow portion corresponding to a ring-like packing; and pouring a rubber material through rubber material lead-in paths provided in at least one of said other female and male metal molds to thereby form said ring-like packing integrally with said housing.

* * * * *